(12) United States Patent
Cavender

(10) Patent No.: US 6,546,744 B1
(45) Date of Patent: Apr. 15, 2003

(54) RECREATIONAL VEHICLE HEAT TRANSFER APPARATUS

(76) Inventor: Billy Cavender, 12826 N. 22$^{nd}$ St., Phoenix, AZ (US) 85022-5809

( * ) Notice: Subject to any disclaimer, the term of this patent is extended or adjusted under 35 U.S.C. 154(b) by 0 days.

(21) Appl. No.: 10/085,452

(22) Filed: Feb. 28, 2002

(51) Int. Cl.$^7$ ................................................. B60H 1/32
(52) U.S. Cl. .............................. 62/244; 62/91; 62/171; 62/310
(58) Field of Search ........................ 62/244, 91, 171, 62/183, 305, 310

(56) References Cited

U.S. PATENT DOCUMENTS

| | | | |
|---|---|---|---|
| 3,738,621 A | * | 6/1973 | Anderson .................... 261/105 |
| 4,031,710 A | | 6/1977 | Rideout |
| 4,361,525 A | * | 11/1982 | Leyland ........................ 165/60 |
| 4,438,635 A | * | 3/1984 | McCoy, Jr. .................... 62/171 |
| 5,003,789 A | | 4/1991 | Gaona et al. |
| 5,076,065 A | * | 12/1991 | Brogan ........................ 261/149 |
| 5,117,644 A | | 6/1992 | Fought |
| 5,285,654 A | * | 2/1994 | Ferdows ....................... 261/103 |
| 5,311,747 A | | 5/1994 | Pringle et al. |
| 5,588,303 A | | 12/1996 | Parks |
| 5,605,052 A | | 2/1997 | Middleton et al. |
| 5,701,748 A | | 12/1997 | Phelps et al. |
| 6,101,823 A | * | 8/2000 | Chi |
| 6,101,831 A | * | 8/2000 | Ciccone ....................... 165/113 |
| 6,178,767 B1 | * | 1/2001 | Pravda ......................... 62/310 |
| 6,338,257 B1 | * | 1/2002 | Chiu et al. ..................... 62/171 |
| 6,367,277 B1 | * | 4/2002 | Kinkel ......................... 261/98 |

* cited by examiner

Primary Examiner—William E. Tapolcai
Assistant Examiner—Mohammad M. Ali
(74) Attorney, Agent, or Firm—Parsons & Goltry; Robert A. Parsons; Michael W. Goltry

(57) ABSTRACT

Disclosed is a recreational vehicle having an attached refrigeration unit including heat-dissipating coils and heat-collecting coils. An evaporative cooler disposed adjacent the condenser is capable of pre-cooling air to the heat-dissipating coils, and a thermostat control assembly is capable of sensing ambient temperature and activating the evaporative cooler when the ambient temperature reaches a threshold ambient temperature providing pre-cooled air to the heat-dissipating coils.

19 Claims, 3 Drawing Sheets

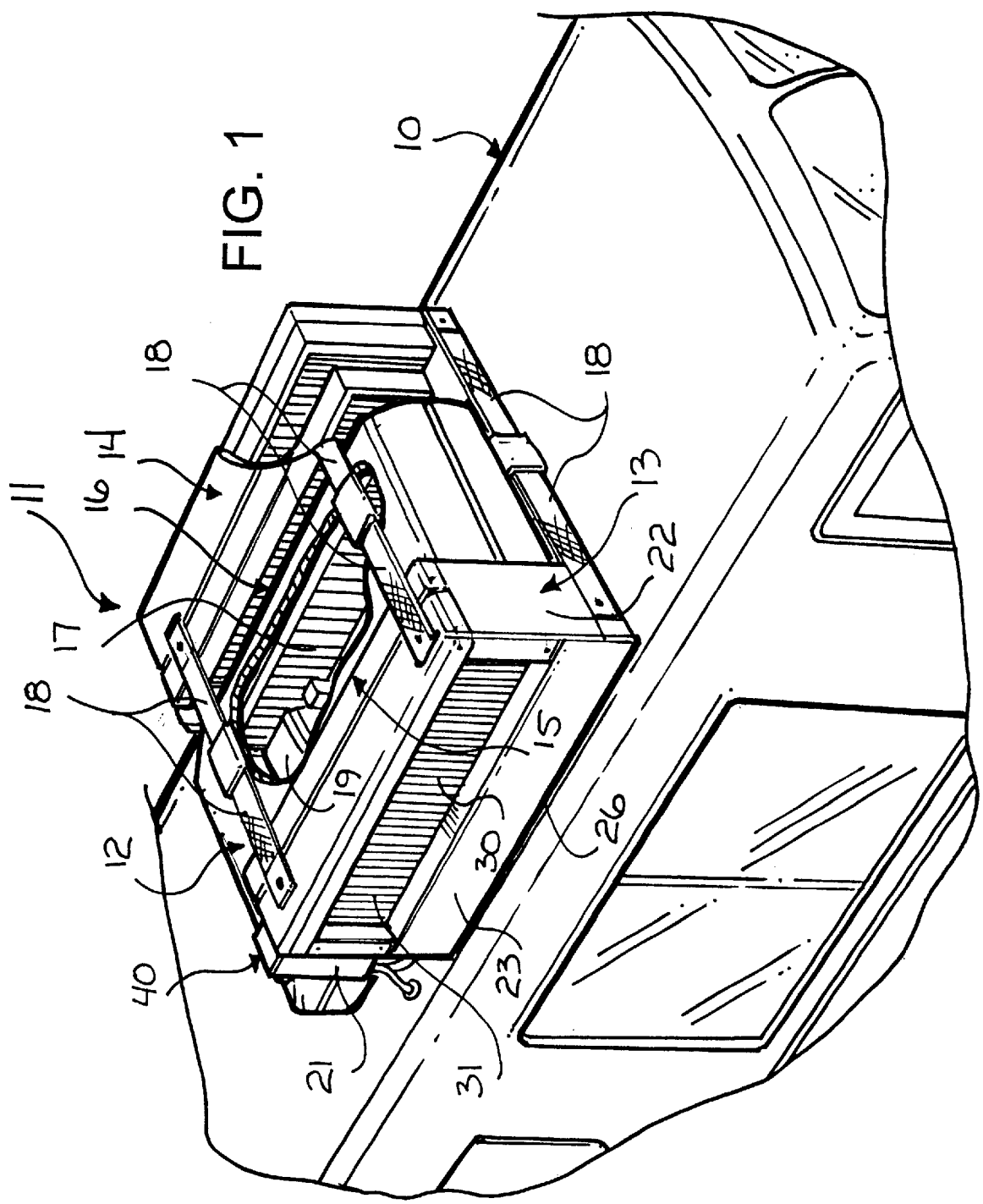

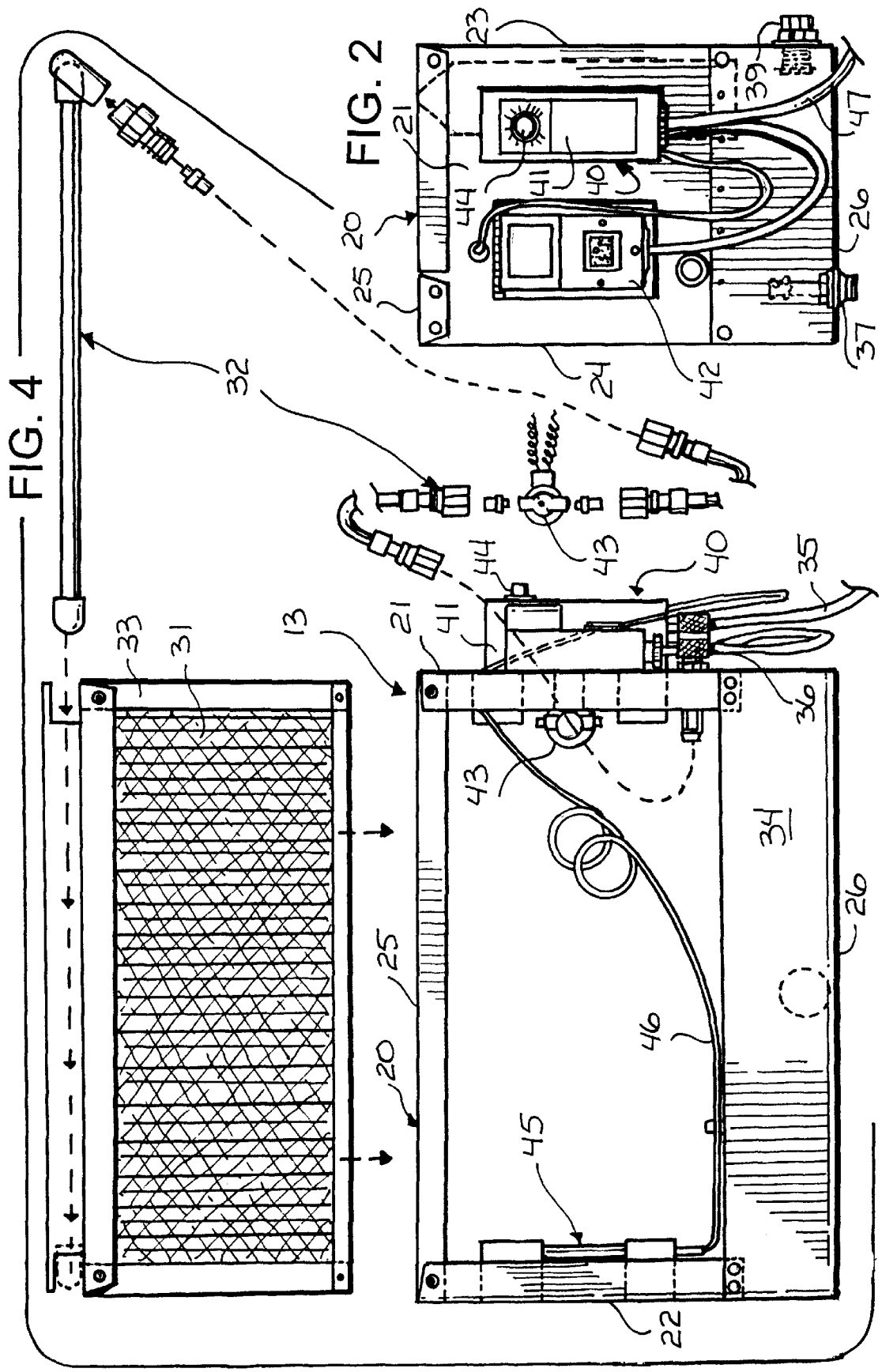

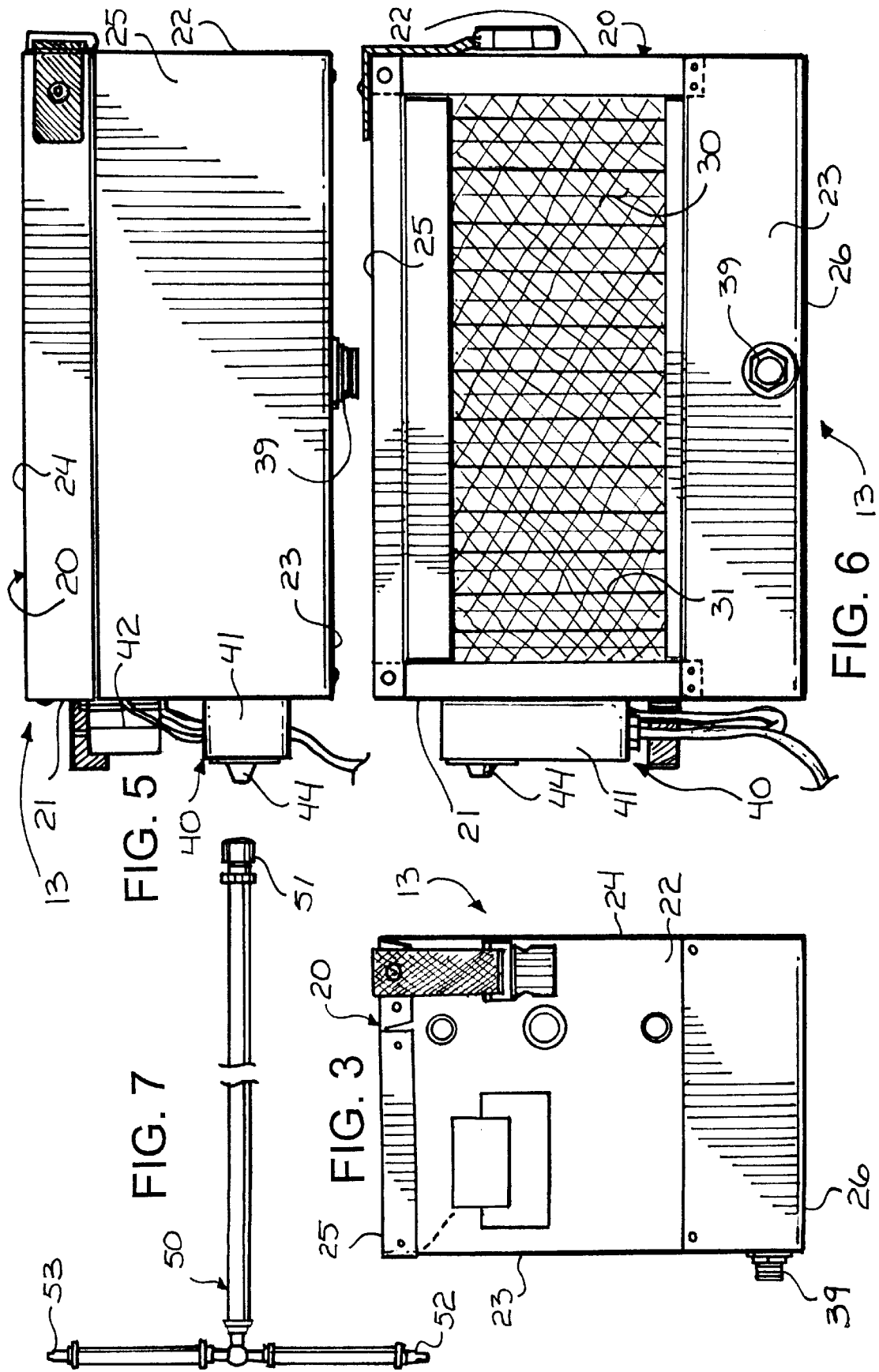

RECREATIONAL VEHICLE HEAT TRANSFER APPARATUS

FIELD OF THE INVENTION

This invention relates to recreational vehicles and to air handling and heat transfer units for recreational vehicles.

BACKGROUND OF THE INVENTION

Between 300,000 and 400,000 recreational vehicles (RVs) are produced each year in the United States. These are primarily vans and panel trucks that are modified by RV manufacturers. One-third of the units are trailers that are not self-propelled. The majority of these are attached to cars and trucks by a ball-type hitch. A growing proportion, however, are towed by pickup trucks with fifth-wheel hitches mounted on the truck bed. This arrangement permits a greater loading on the hitch. Motor homes built on truck chassis that have been supplied by major truck manufacturers to the builders account for the balance of recreational vehicle production.

Many recreational vehicles, especially self-propelled motor homes, are now furnished with refrigeration units for heating and cooling interior spaces. Although refrigeration units are highly desirable for providing conditioned air spaces, they labor vigorously and consume large amounts of energy in providing interior spaces with conditioned air when the outdoor temperature is high.

Thus, there is a need for an improved RV heat transfer apparatus that is efficient and economical, and for novel and useful attachments that are adapted and arranged for maintaining the efficiency and cost effectiveness of existing RV refrigeration units.

SUMMARY OF THE INVENTION

The above problems and others are at least partially solved and the above purposes and others realized in improvements concerning recreational vehicles and improved heat transfer apparatus for recreational vehicles. An exemplary embodiment of the invention consists of a recreational vehicle having an attached refrigeration unit including heat-dissipating coils and heat-collecting coils. An evaporative cooler disposed adjacent the condenser is capable of pre-cooling air to the heat-dissipating coils, and a thermostat control assembly is capable of sensing ambient temperature and activating the evaporative cooler when the ambient temperature reaches a threshold ambient temperature providing pre-cooled air to the heat-dissipating coils. Preferably, the evaporative cooler consists of a housing supporting the media, a water source coupled in fluid communication with the media and an associated valve, which is movable between a closed position preventing water from passing to the media from the water source and an open position permitting water to pass from the water source to the media. The water source consists of a reservoir supported by the housing. In another embodiment, the water source consists of a dedicated water source, namely, a water faucet or other form of dedicated water source. The evaporative cooler is designed for removable emplacement in operative relationship with the refrigeration unit, and is preferably attached to the refrigeration unit and secured in place with straps. The straps are preferably adjustable, such as with buckle assemblies or the like. The evaporative cooler can be furnished with an adjustable leg kit for facilitating varying installation requirements.

Another embodiment of the invention consists of a recreational vehicle having an attached refrigeration unit including heat-dissipating coils and heat-collecting coils. The refrigeration unit is capable of transferring heat out of the recreational vehicle by moving air into the recreational vehicle through the heat-collecting coils by way of opposing first and second inlets of the refrigeration unit. A first evaporative cooler disposed adjacent the first inlet is capable of pre-cooling air to the heat-dissipating coils by way of the first inlet. A second evaporative cooler disposed adjacent the second inlet is capable of pre-cooling air to the heat-dissipating coils by way of the second inlet. A thermostat control assembly is also provided, which is capable of sensing ambient temperature and activating the first and second evaporative coolers when the ambient temperature reaches a threshold ambient temperature providing pre-cooled air to the heat-dissipating coils. Preferably, the first evaporative cooler consists of a housing supporting the first media, a water source coupled in fluid communication with the media and an associated valve, which is movable between a closed position preventing water from passing to the first media from the water source and an open position permitting water to pass from the water source to the first media. The water source consists of a reservoir supported by the housing. In another embodiment, the water source consists of a dedicated water source, namely, a water faucet or other form of dedicated water source. The second evaporative cooler consists of a housing supporting the second media, a water source coupled in fluid communication with the media and an associated valve, which is movable between a closed position preventing water from passing to the second media from the water source and an open position permitting water to pass from the water source to the second media. The water source consists of a reservoir supported by the housing. In another embodiment, the water source consists of a dedicated water source, namely, a water faucet or other form of dedicated water source. If a dedicated water source is employed, it may be used for both the first and second evaporative coolers if desired. The first and second evaporative coolers are designed for removable emplacement in operative relationship with the refrigeration unit, and are preferably attached to the refrigeration unit and to each other and secured in place with straps. The straps are preferably adjustable, such as with buckle assemblies or the like. The evaporative coolers can each be furnished with an adjustable leg kit for facilitating varying installation requirements.

Consistent with the foregoing, the invention also contemplates associated methods.

BRIEF DESCRIPTION OF THE DRAWINGS

Referring to the drawings:

FIG. 1 is a recreational vehicle having an attached heat transfer apparatus, in accordance with the principle of the invention, the heat transfer apparatus including a refrigeration unit and attached evaporative coolers capable of pre-cooling air to the refrigeration unit;

FIG. 2 is an end elevation of one of the evaporative coolers of FIG. 1;

FIG. 3 is another end elevation of the evaporative cooler depicted in FIG. 2;

FIG. 4 is a schematic representation of the evaporative cooler depicted in FIG. 2;

FIG. 5 is a top plan of the evaporative cooler depicted in FIG. 2;

FIG. 6 is a side elevation of the evaporative cooler of FIG. 2; and

FIG. 7 is a conduit assembly for use with the heat exchanging apparatus of FIG. 1.

DETAILED DESCRIPTION OF A PREFERRED EMBODIMENT

Turning now to the drawings, in which like reference characters indicate corresponding elements throughout the several views, attention is first directed to FIG. 1 in which is seen a recreational vehicle (RV), embodying the principle of the instant invention, generally indicated by the reference character 10 including attached heat transfer apparatus 11. In this embodiment, RV 10 is a self-propelled motor home and apparatus 11 is capable of delivering conditioned air to the enclosed area of RV 10 for maintaining a desired temperature within the enclosed space of RV 10. Apparatus 11 is attached externally to the roof of RV 10 as a matter of example, and it can be attached externally at other locations.

Apparatus 11 consists of a refrigeration unit 12 and attached evaporative coolers (ECs) 13, 14. Power to apparatus 11 is provided from RV, from a generator, from a dedicated power source such as from a power outlet or a stand-alone outlet of the type commonly found at RV parks, etc. Unit and ECs 13, 14 can each be independently powered if desired, or receive power from the same or different power sources. Typically, unit 12 will be an existing feature powered by RV, with ECs 13, 14 subsequently attached when need during hot weather and coupled to a selected power source. Power to ECs 13, 14 is provided by way of power cord 47 (FIG. 2), and ECs 13, 14 are preferably coupled together electrically with suitable electrical power cords. As a matter of example, ECs 13, 14 can be provided with outlets for accommodating plugs of electrical power cords for coupling ECs 13, 14 together electrically. Unit 12 is capable of transferring heat out of RV 10 by drawing air into the recreational vehicle through a condenser by way of opposing inlets 15, 16 of unit 12. Unit 12 is generally representative of a typical RV refrigeration unit, and includes a compressor that compresses gas, such as Freon, causing it to become hot. This high-pressure gas runs through a set of coils (hereinafter referred to heat-dissipating coils 17) so it can dissipate its heat, and it condenses into a liquid. The liquid runs through an expansion valve, and in the process it evaporates to become cold, low-pressure gas. This cold gas runs through another set of coils (hereinafter referred to as heat-collecting coils 19) that allow the gas to absorb heat and cool down the air inside the RV. Further details of unit 12 not specifically illustrated and described will be readily understood and appreciated by those of ordinary skill in the art.

Evaporative cooler (EC) 13 is secured and disposed adjacent inlet 15 and EC 14 is secured and disposed adjacent inlet 16. Preferably, EC 13 is positioned against unit 12 opposing inlet 15 and EC 14 is positioned against unit 12 opposing inlet 16. Straps 18 secure ECs 13, 14 to each other and to unit 12. Straps 18 are made of durable material such as durable nylon or the like, and have ends secured to ECs 13, 14 and free ends secured with buckles, permitting straps 18 to be loosened and tightened as needed. Preferably, four opposing pairs of straps 18 are used (only three are illustrated in FIG. 1), two pair coupling the sides of ECs 13, 14 along either end of unit 12 and two pair coupling the tops of ECs 13, 14 overlying unit 12. Less or more pairs of straps can be used, and this really depends on specific needs or preferences. Because straps 18 are buckled, they are easily secured for affixing ECs 13, 14 in place, and detachable permitting removal of ECs 13, 14 from unit 12 during periods of non-use. Any suitable strap form capable of securing ECs 13, 14 to each other and to unit 12 can be used in accordance with this disclosure. Rather then using straps to directly attach together ECs 13, 14, Straps can be used for coupling ECs 13, 14 directly to unit 12, in which case unit 12 would be furnished with attached straps itself or features for attaching working ends of straps of ECs 13, 14. Rather than engagable straps, fixed couplings can be employed for securing ECs 13, 14 in place in a substantially permanent fashion. Rivets, screws or other form of mechanical fastening structure can also be used for securing ECs 13, 14 in place, directly to unit 12 and/or directly to RV 10. EC 13 is capable of pre-cooling air to the heat-dissipating coils of the condenser of unit 12 by evaporatively cooling ambient air as it is moved to the heat-dissipating coils of the condenser of unit 12 by way of inlet 15. EC 14 is capable of pre-cooling air to the heat-dissipating coils of the condenser of unit 12 by evaporatively cooling ambient air as it is moved to the heat-dissipating coils of the condenser of unit 12 by way of inlet 16. Preferably, a fan of unit 12 draws air through ECs 13, 14, although ECs 13, 14 can be provided with their own fans. ECs 13, 14 are substantially identical and only one of them is discussed herein, namely, EC 13.

As a matter of illustration, FIGS. 2, 3, 5 and 6 illustrate various views of EC 13. FIG. 2 is an end elevation of EC 13, FIG. 3 is the opposing end elevation of EC 13, FIG. 5 is a top plan of EC 13 and FIG. 6 is a side elevation of EC 13. Considering FIGS. 2, 3, 5, and 6 in relevant part, EC 13 consists of a generally rectangular housing 20 having opposing ends 21, 22 and opposing sides 23, 24, a top 25 and an opposing bottom 26. Housing 20 is constructed largely of sheet metal, durable plastic or of like material typically used in the construction of EC housings. An inlet 30 of housing 20 is disposed at side 23 as shown in FIGS. 1 and 6 and an outlet (not shown) of housing 20 is disposed at side 24. Housing 20 carries media 31, which is disposed between inlet 30 and the outlet of housing 20. In this embodiment, media 31 is disposed proximate inlet 30 and can be seen therethrough in FIGS. 1 and 6.

When EC 13 is activated, water from a water source is delivered to media 31 via plumbing 32 (FIG. 4) wetting it. Plumbing 32 is held and contained by housing 20. Ambient air is drawn through the wetted media 31 from inlet 30 cooling the air through evaporation, in which the cooled air is then drawn outwardly from the outlet of housing 20. An electric impeller (not shown) of unit 12 drives the ambient air as described. A framework 33 holds and supports media 31. The combination of framework 33 and media 31 constitutes a media insert, which is received by housing 20 and removable for replacement, cleaning, maintenance, etc., and this is typical with most conventional ECs. Media 31 is any suitable media commonly employed with conventional ECs. In one embodiment, the water source of EC 13 is a volume of water held by a reservoir 34 of housing 20. Reservoir 34 is contained by housing 20, is disposed at bottom 26 and coupled in fluid communication with media 31 via plumbing 32. When EC 13 activates, an electric pump (not shown) forces water from reservoir 34 to media 31 via plumbing. Water that yields from media 31 is collected by reservoir 34 for recirculation, and media 31 and reservoir are constructed and arranged to permit water to transfer from media 31 to reservoir 34. Alternatively, the water source of EC 13 is a pressurized and dedicated water source, namely, a water faucet from a house or of the stand-alone type commonly found in RV parks. In this embodiment, a hose 35, such as a garden hose, is attached to the faucet in a conventional manner and to a fitting 36 of plumbing 32. The attachment between hose 35 and fitting 46 is preferably a conventional quick connect attachment or float, but a threaded attachment or other form of suitable attachment can be made. In this embodiment, reservoir 34 is employed for collecting water from media 31. As seen in FIG. 2, reservoir 34 is furnished with a water overflow element 37 for releasing water from reservoir 34 when it becomes too full and maintaining a desired water level in reservoir 34 and an openable drain 39 for allowing water from reservoir 43 to be drained therefrom.

Apparatus 11 is furnished with a thermostat control assembly 40 including a thermostat 41, a switch relay 42 and a valve 43, which are coupled electrically to one another. In this embodiment, thermostat 41, relay 42 and valve 43 are carried by EC 13, thermostat 41 and relay 42 being attached externally at end 21 and valve 43 being disposed with plumbing 32. Thermostat 41 is furnished with a power cord 47 which is capable of being coupled in electrical communication with a power source, whether a power source of RV 10 or other power source, such as a generator, a dedicated power source such as an electrical outlet at an RV park, etc. Power is provided to EC 13 preferably by way of power cord 47. Preferably, thermostat 41 is coupled electrically to relay 42, which is coupled electrically to valve 43. Valve 43 is disposed with plumbing 32 and in response to signals from relay 42 is movable between a closed position and an open position permitting water from the water source to media 31 through plumbing 32. Thermostat 41 is a device that detects temperature changes for the purpose of maintaining the ambient air temperature of condenser air for unit 12 essentially constant. Thermostat 41 is capable of being set to a desired temperature, and includes an attached knob 44 for facilitating this adjustment.

Thermostat 41 generates electrical signals when the ambient temperature exceeds a desired/threshold value, which signals are sent to relay 42, causing it to activate EC 13 providing the heat-dissipating coils of the condenser of unit 12 with pre-cooled air maintaining and increasing the efficiency of unit 12 when the ambient temperature is high. The activation of EC 13 is characterized by electrical signals sent to valve 43 from relay 42 moving it from its closed position to its open position permitting water to move through plumbing 32 from the water source to media 31 wetting it and the activation of the impeller of unit 12 drawing ambient air into inlet 30 and through wetted media 31 cooling the ambient air through evaporation and then drawing the cooled air through the outlet of EC 13 to inlet 15 of refrigeration unit 12. When the ambient temperature falls below the desired value, thermostat 41 generates electrical signals to relay 42 causing it to deactivate EC 13, in which valve 43 closes.

Thermostat 41 can be any suitable thermostat that is capable of sensing the ambient temperature and sending electrical signals to relay 42 activating EC 13 as herein described. In the instant embodiment, thermostat 41 detects temperature changes with a thermostatic bulb 45 incorporating a fluid filled capillary tube 46. Like a conventional thermostatic bulb, thermostatic bulb 45 converts temperature to pressure, which is experienced at capillary tube 46. As the temperature increases, the pressure in capillary tube 46 increases, which is sensed by thermostat 41. When the pressure exceeds a desired value, it sends electrical signals to relay 42 activating EC 13. When the pressure falls below the desired value, which is sensed by thermostat 41, it sends electrical signals to relay 42 deactivating EC 13.

The operation and function of EC 14 in connection with inlet 16 of unit 12 is the same as EC 13 in connection with inlet 15. EC 14 is furnished with its own thermostat control assembly. However, the operation of EC 14 can be controlled by thermostat control assembly 40 and this is preferred, in which ECs 13, 14 are together controlled by thermostat control assembly 40. In this embodiment, thermostat 41 generates electrical signals when the ambient temperature exceeds a desired value, which signals are sent to relay 42, causing it to activate ECs 13, 14 providing the heat-dissipating coils of the condenser of unit 12 with pre-cooled/conditioned air increasing the efficiency of unit 12 when the ambient temperature is high. The activation of ECs 13, 14 is characterized by electrical signals sent to valves of ECs 13, 14, respectively, from relay 42 moving them from their closed positions to their open positions permitting water to move through the plumbing of each from their respective water sources to their respective media wetting them and the activation of the impeller of unit 12 evaporatively cooling air and drawing the evaporatively cooled air into unit 12 through its inlets 15, 16 to the heat-dissipating coils of the condenser of unit 12. When the ambient temperature falls below the desired value, thermostat 41 generates electrical signals to relay 42 causing it to deactivate ECs 13, 14 in which the valves of ECs 13, 14 close.

Although it is preferred that ECs 13, 14 each have their own water sources, they can share a water source if desired, whether it be a reservoir of one of ECs 13 and 14 or a dedicated water source, i.e., a faucet. In the case of the latter, FIG. 7 represents a T-shaped water hose assembly 50 having an inlet end 51 adapted and arranged to attach to a faucet and a pair of outlet ends 52, 53 each adapted and arranged to connect to the fittings of the plumbing of ECs 13, 14, respectively, and in the manner discussed previously in connection with fitting 36 of EC 13. Plumbing 32 (FIG. 4) can be configured to cooperate with a common water source and the media of ECs 13, 14 if desired.

The present invention is described above with reference to preferred embodiments. However, those skilled in the art will recognize that changes and modifications may be made in the described embodiments without departing from the nature and scope of the present invention. For instance, apparatus 11 is furnished with two ECs to accommodate the two inlets of unit 12. Less or more ECs may be employed depending on desired needs and/or depending on the number of inlets of an associated refrigeration unit. Also, even though a refrigeration unit may have a plurality of inlets, only one EC can be used in connection with one or more of the inlets of such a refrigeration unit if desired. Various other changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. Apparatus comprising:
   a recreational vehicle having an attached refrigeration unit including heat-dissipating coils and heat-collecting coils, the refrigeration unit capable of transferring heat out of the recreational vehicle by moving air into the recreational vehicle through the heat-collecting coils by way of opposing first and second inlets of the refrigeration unit;
   a first evaporative cooler disposed adjacent the first inlet capable of pre-cooling air to the heat-dissipating coils by way of the first inlet, the first evaporative cooler including a housing supporting first media, a water source, a valve coupled in fluid communication with the water source and the first media and movable by the thermostat control assembly between a closed position and an open position permitting water to move from the water source to the first media;

a second evaporative cooler disposed adjacent the second inlet capable of pre-cooling air to the heat-dissipating coils by way of the second inlet; and a thermostat control assembly capable of sensing ambient temperature and activating the first and second evaporative coolers when the ambient temperature reaches a threshold ambient temperature providing pre-cooled air to the heat-dissipating coils.

2. Apparatus of claim 1, wherein the water source comprises water contained by a reservoir supported by the housing.

3. Apparatus of claim 1, wherein the water source comprises a dedicated water source.

4. Apparatus of claim 1, wherein the housing supports a reservoir capable collecting water from the first media.

5. Apparatus of claim 1, the second evaporative cooler comprising:

a housing supporting second media;

a water source;

a valve coupled in fluid communication with the water source and the second media and movable by the thermostat control assembly between a closed position and an open position permitting water to move from the water source to the second media.

6. Apparatus of claim 5, wherein the water source comprises water contained by a reservoir supported by the housing.

7. Apparatus of claim 5, wherein the water source comprises a dedicated water source.

8. Apparatus of claim 5, wherein the housing supports a reservoir capable collecting water from the second media.

9. Apparatus of claim 1, further comprises adjustable straps securing the first and second evaporative coolers to each other and to the refrigeration unit.

10. In a recreational vehicle having an attached refrigeration unit including heat-dissipating coils and heat-collecting coils, the refrigeration unit capable of transferring heat out of the recreational vehicle by moving air into the recreational vehicle through the heat-collecting coils by way of opposing first and second inlets of the refrigeration unit, apparatus comprising:

a first evaporative cooler disposed adjacent the first inlet capable of pre-cooling air to the heat-dissipating coils by way of the first inlet, the first evaporative cooler including a housing supporting first media, a water source, and a valve coupled in fluid communication with the water source and the first media and movable by the thermostat control assembly between a closed position and an open position permitting water to move from the water source to the first media;

a second evaporative cooler disposed adjacent the second inlet capable of pre-cooling air to the heat-dissipating coils by way of the second inlet; and a thermostat control assembly capable of sensing ambient temperature and activating the first and second evaporative coolers when the ambient temperature reaches a threshold ambient temperature providing pre-cooled air to the heat-dissipating coils.

11. Apparatus of claim 10, wherein the water source comprises water contained by a reservoir supported by the housing.

12. Apparatus of claim 10, wherein the water source comprises a dedicated water source.

13. Apparatus of claim 10, wherein the housing supports a reservoir capable collecting water from the first media.

14. Apparatus of claim 10, the second evaporative cooler comprising:

a housing supporting second media;

a water source;

a valve coupled in fluid communication with the water source and the second media and movable by the thermostat control assembly between a closed position and an open position permitting water to move from the water source to the second media.

15. Apparatus of claim 14, wherein the water source comprises water contained by a reservoir supported by the housing.

16. Apparatus of claim 14, wherein the water source comprises a dedicated water source.

17. Apparatus of claim 14, wherein the housing supports a reservoir capable collecting water from the second media.

18. Apparatus of claim 10, further comprises adjustable straps securing the first and second evaporative coolers to each other and to the refrigeration unit.

19. In a recreational vehicle having an attached refrigeration unit including heat-dissipating coils and heat-collecting coils, the refrigeration unit capable of transferring heat out of the recreational vehicle by moving air into the recreational vehicle through the heat-collecting coils by way of opposing first and second inlets of the refrigeration unit, a method comprising steps of:

disposing a first evaporative cooler adjacent the first inlet;

disposing a second evaporative cooler adjacent the second inlet;

associating with the first and second evaporative coolers a thermostat control assembly capable of sensing ambient temperature and activating the first and second evaporative coolers when the ambient temperature reaches a threshold ambient temperature providing pre-cooled air to the heat-dissipating coils by way of the first and second inlets;

securing the first and second evaporative coolers to each other and to the refrigeration unit with straps.

* * * * *